(12) United States Patent
Muhich

(10) Patent No.: US 6,386,321 B1
(45) Date of Patent: May 14, 2002

(54) SELF LEVELING TREE STAND

(76) Inventor: Tony Muhich, 2211 Brookwood Ct., Joliet, IL (US) 60435

( * ) Notice: Subject to any disclaimer, the term of this patent is extended or adjusted under 35 U.S.C. 154(b) by 0 days.

(21) Appl. No.: 09/816,901

(22) Filed: Mar. 23, 2001

(51) Int. Cl.⁷ .............................. E04G 3/00; A63B 27/00
(52) U.S. Cl. ....................................... 182/187; 132/135
(58) Field of Search ................................ 182/187, 188, 182/116, 135, 136

(56) References Cited

U.S. PATENT DOCUMENTS

| | | | | |
|---|---|---|---|---|
| 5,339,922 A | * | 8/1994 | Beechler | 182/187 X |
| 5,927,437 A | * | 7/1999 | Fast | 182/187 |
| 6,196,354 B1 | * | 3/2001 | Anthony et al. | 182/187 |

* cited by examiner

Primary Examiner—Daniel P. Stodola
Assistant Examiner—Hugh B. Thompson
(74) Attorney, Agent, or Firm—Goldstein Law Offices, P.C.

(57) ABSTRACT

A tree stand, for attaching onto a tree and creating an elevated platform thereon, comprising a platform having a pair of side members, a pair of seat supports pivotally attached to the platform, a bracing system for fixing an angle between the platform and side members, and a pair of upper levelers and a pair of lower levelers. The lower levelers extend from the side members and adjust to the contours of the tree. The upper levelers extend from the seat supports and further aid adjustment to the contours of the tree. The bracing system is adjustable to adjust the angle between the platforms and seat supports. A seat assembly is mounted to the seat supports and provides height adjustment to the user. The adjustability of the upper levelers, lower levelers, and bracing system help ensure that a horizontal platform can be achieved despite trees of varying configurations and lean angles.

7 Claims, 6 Drawing Sheets

SELF LEVELING TREE STAND

BACKGROUND OF THE INVENTION

The invention relates to a self leveling tree stand. More particularly, the invention relates to a tree stand which provides a portable platform which may be quickly and easily mounted in a tree, and which has several leveling adaptations to create a level platform despite the formation and lean angle of the tree.

Tree stands are often used by hunters, nature observers, photographers, and campers to achieve a higher vantage point than could be obtained while at ground level. Once securely mounted in a tree, the stand gives the user to ability to see for further distances as well as see terrain which would otherwise be obscured by undergrowth. When used for hunting in particular, the stand provides the hunter with an advantage, since the senses of many wild animals are naturally attuned to dangers at ground level, making it less likely that the hunter will be detected by the game.

Various stands are available on the market which will provide a comfortable and safe platform when used on a tree having a certain angle and a certain configuration. However, it is well known that trees grow in an infinite number of configurations. Many of these configurations are either incompatible with these tree stands, or may be used with these tree stands with less than ideal results.

Generally when using a tree stand, it is desirable that the platform and seat is perfectly level. A level tree stand gives the user the greatest sense of security and perhaps the greatest amount of actual safety.

Accordingly, several attempts have been made in the prior art to provide a "leveling" tree stand—which has provisions for leveling the stand in circumstances which would otherwise leave the platform extending at a non-horizontal angle. For example, U.S. Pat. No. 36,276 to Smith, discloses a tree stand which allows adjustment of the bracing cables in attempt to level the platform under certain conditions. U.S. Pat. No. 6,085,868 to Anthony et al. discloses a portable tree stand which allows adjustment of the seat and platform with respect to each other, but provides little adaptability to the tree itself. U.S. Pat. Nos. 5,016,733 to Bradley and 6,363,941 to Richard, both discloses tree stands which use a centrally located cradle, coplanar with the platform, to help adjust the angle of the platform.

While these units may be suitable for the particular purpose employed, or for general use, they would not be as suitable for the purposes of the present invention as disclosed hereafter.

SUMMARY OF THE INVENTION

It is an object of the invention to provide a tree stand which is quickly and easily attachable to various trees having different configurations and lean angles to provide an elevated platform for the user. Accordingly, the tree stand has provisions for attaching to the tree and adjusting the stand for optimum comfort and safety of the user.

It is another object of the invention to provide a tree stand which has a platform that is easily leveled to a horizontal position. Accordingly, the tree stand has both upper and lower levelers, located both coplanar with the platform and at the seat mount—maximizing the ability of the tree stand to adjust to trees of various sizes and configurations. Further, the stabilizing cables are adjustable to provide relative adjustment of the platform with respect to the seat mount.

It is a further object of the invention to provide a tree stand which maximizes the comfort of the user. Accordingly, a seat is provided which is adjustable to the taste of the user. In addition, a bow holder may be provided for the convenience of the user.

It is a still further object of the invention to provide a stand which is portable and is easily transportable to a remote location for use. Accordingly, the tree stand folds compactly and may be carried by the user like a back pack.

The invention is a tree stand, for attaching onto a tree and creating an elevated platform thereon, comprising a platform having a pair of side members, a pair of seat supports pivotally attached to the platform, a bracing system for fixing an angle between the platform and side members, a pair of upper levelers, and a pair of lower levelers. The lower levelers extend from the side members and adjust to the contours of the tree. The upper levelers extend from the seat supports and further aid adjustment to the contours of the tree. The bracing system is adjustable to adjust the angle between the platforms and seat supports. A seat assembly is mounted to the seat supports and provides height adjustment to the user. The adjustability of the upper levelers, lower levelers, and bracing system help ensure that a horizontal platform can be achieved despite trees of varying configurations and lean angles.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
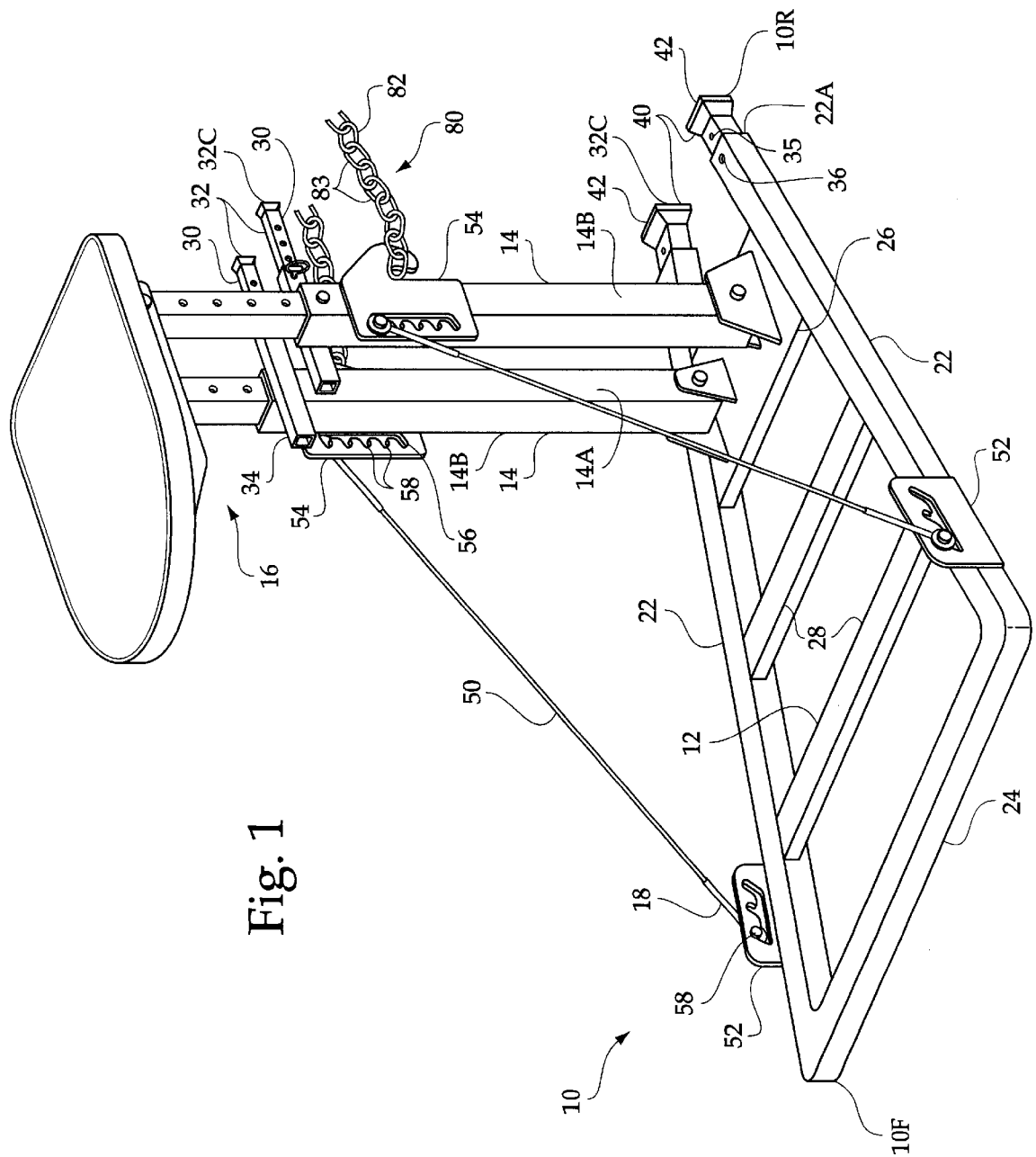
FIG. 1 is a diagrammatic perspective view, illustrating the tree stand, per se.

FIG. 1 illustrates a tree stand 10 having a front 10F and a rear 10R, having a platform 12, a pair of seat supports 14, a seat assembly 16, and a bracing system 18. The platform 20 comprises a framework, comprising side members 22, a front member 24, and a rear member 26. Several cross members 28 extend between the side members, in the region between the front member 24 and rear member 26, and extend parallel to the front member 24 and rear member 26. The side members 22 are angled toward each other, such that the rear member 26 is significantly shorter than the front member 24. The components that make up the framework of the platform 20 are typically rectangular cross-sectional tubing which are all arranged to be substantially coplanar.

Figure 3:
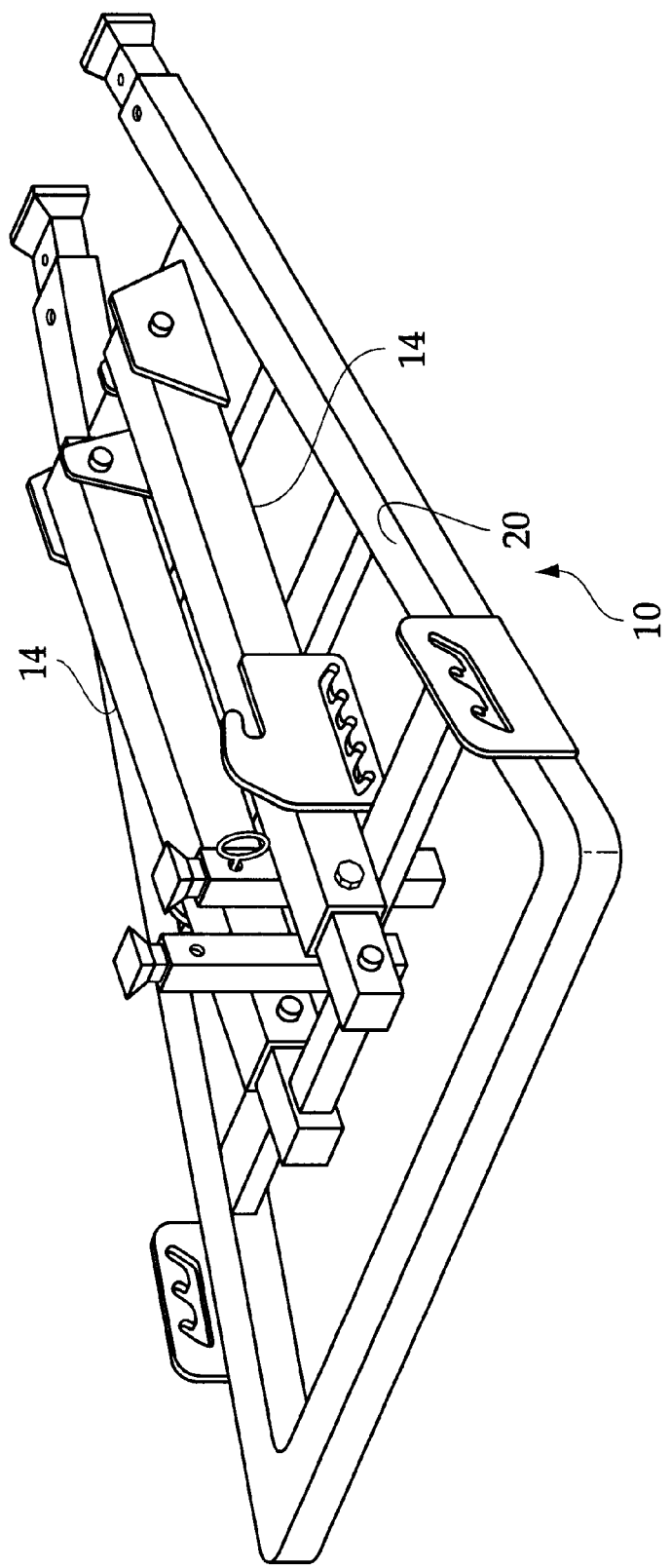
FIG. 3 is a diagrammatic perspective view, illustrating the tree stand folded flat, ready for transport.

The seat supports 14 are hingeably mounted to the rear member 26, and are capable of extending perpendicularly upward from the rear member 26, as shown in FIG. 1, and are capable of laying flat against the platform 20, as illustrated in FIG. 3. The seat supports 14 are tubular, and are preferably of rectangular cross section, having inner sides 14A which face each other, and outer sides 14B which face away from each other. The seat assembly 16 is mounted to the seat supports 14 opposite from the platform 20.

In accordance with the present invention, the tree stand 10 has a pair of upper levelers 30 and a pair of lower levelers 40 at the rear 10R. The upper levelers 30 include an upper stanchion 32 and a sleeve 34. The upper levelers 30 are sized for close, slidable movement within the sleeves 34. The sleeves 34 are each preferably mounted on the inner sides 14A of the seat supports 14.

The lower levelers 40 include a lower stanchion 42, and are sized for movement within the side members 22. Accordingly, the side members 22 are tubular and each have an open end 22A at the rear 10R which allows close, slidable movement of the lower stanchions 42 therein.

Each upper stanchion 32 and lower stanchion 42 has a contact end 32C, and a plurality of transverse bores 35 spaced along the stanchions 32 and 42. The sleeves 34 and side members 22 each have a matching bore 36, which may be selectively aligned with one of the transverse bores 35 of its associated stanchion, and secured with a pin 38 to fix the relative position of one of the upper stanchions 32 and its associated sleeve 34, or one of the lower stanchions 42 and its associated side member 22. Accordingly, the combination of transverse bores 35, matching bores 36 and pins 38 allows the relative position of each of the stanchions 32 and 42 to be adjusted.

The bracing system 18 provides structural support between the platform 20 and the seat supports 14 and helps maintain an angle between the platform 20 and seat supports 14. In particular, the bracing system 18 includes a pair of bracing cables 50 which are each attached between one of the side members 22 near the front 10F and one of the seat supports 14. To facilitate attachment and adjustment of the bracing cables 50, a platform bracing plate 52 is attached to each side member 22, and a seat support bracing plate 54 is attached to each seat support 14. The seat support bracing plates 54 are preferably attached on the outer sides 14A of the seat supports 14. Each of the seat support bracing plates 54 and platform bracing plates 52 have a gated cutouts 56. Each of the gated cutouts 56 have a plurality of slots 58. Each end of each of the bracing cables 50 has a coupling 58 which extends in the gated cutouts 56, and selectively rests within one of the slots 58, where a strong structural bond between the bracing cables 50 and plates 52 and 54 is achieved. The various slots 58 of the gated cutouts 56 allow the point of connection of the bracing cables 50 to be adjusted vertically on the seat support bracing plates 54 and horizontally on the platform bracing plates 52. Being that the bracing cables 50 are of fixed length, such adjustment allows the relative angle of the platform 20 with respect to the seat supports 14 to be adjusted.

The coupling 58 is shown in simplified form, comprising a pair of parallel washers or eyelets, connected by a rod, which sandwich one of the plates 52 and 54 therebetween and allow easy adjustment into the various slots 58. However, in actual practice, a more secure scheme would be employed, perhaps involving a washer extending against one side of the plate, a bolt to extend transversely through the slot, and a wing nut to fasten against the other side of the plate to fix the position of the coupling 58 within the slot.

Figure 2:
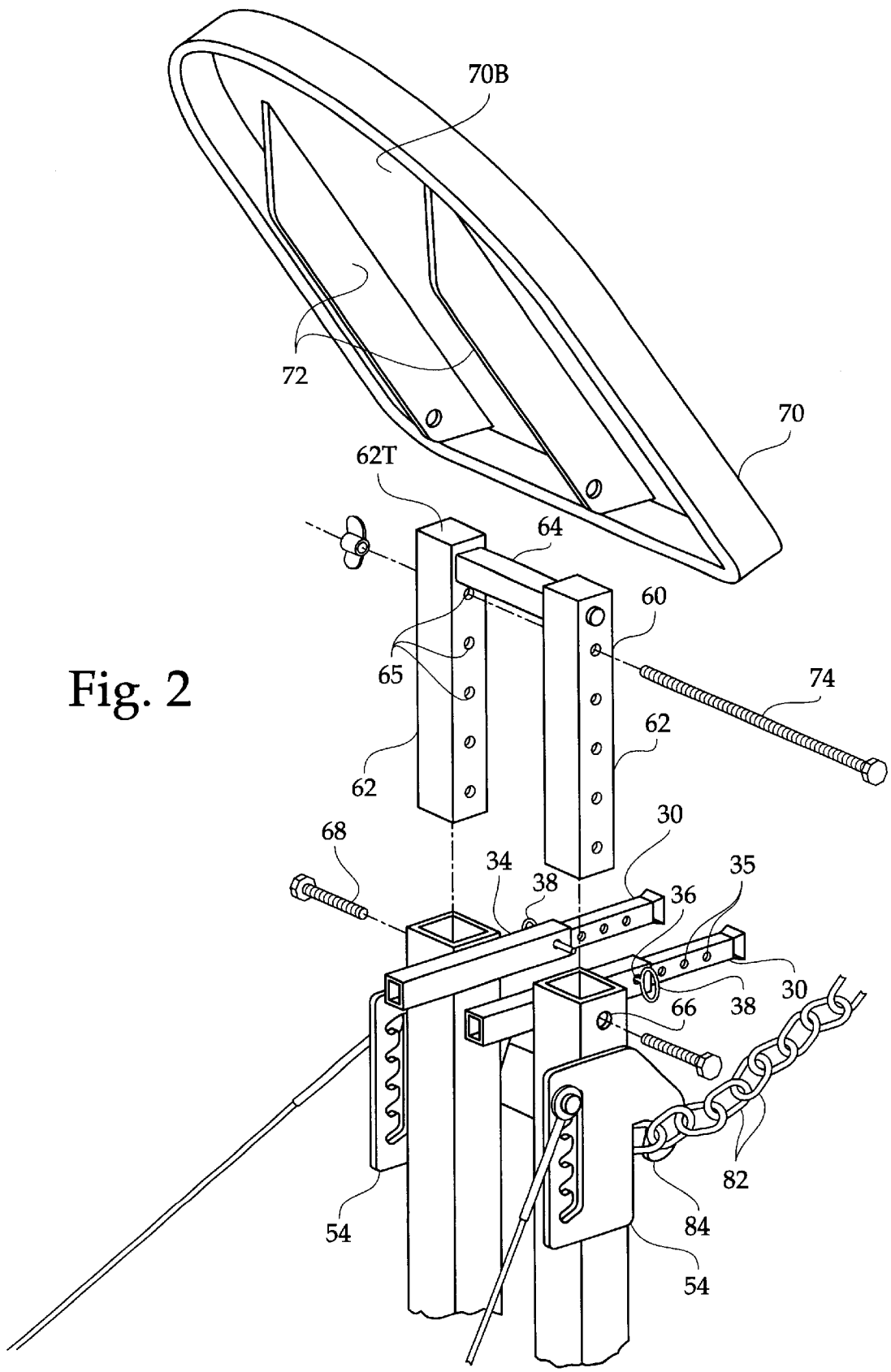
FIG. 2 is an exploded view, illustrating interconnection of various components of the seat assembly, and attachment with the seat mounting supports.

FIG. 2 details the seat assembly 16, wherein a seat carrier 60 includes a pair of parallel seat mounting members 62 which are rigidly attached by a crossbar 64. The seat mounting members 62 each have a seat mounting member top 62T and a seat mounting member bottom 62B, wherein the crossbar 64 extends between the seat mounting members 62 near the seat mounting member top 62T. In addition, the seat mounting member bottoms 62B extend into the seat supports 14 where they are sized for close, slidable movement therein. Further, transverse bores 65 are present along the seat mounting members 62, and a matching bore 66 is located on each of the seat supports 14. The transverse bores 65 are selectively alignable with the matching bores 66, and then fastenable with a seat adjustment bolt 68 to fix the relative vertical position of the seat assembly 16.

The seat assembly 16 includes a seat 70, having a bottom 72, and a pair of parallel brackets 72 extending longitudinally along the bottom 72. The brackets 72 engage the seat mounting member top 62T and are fastened thereto by a long bolt 74 which extends through the brackets 72 and through a pair of the transverse bores 65 in the seat mounting members 62. The brackets 72 are positioned to still allow the seat 70 to pivot upwards, wherein the seat 70 extends substantially parallel to the seat mounting members 62 and to the seat supports 14.

Figure 4:
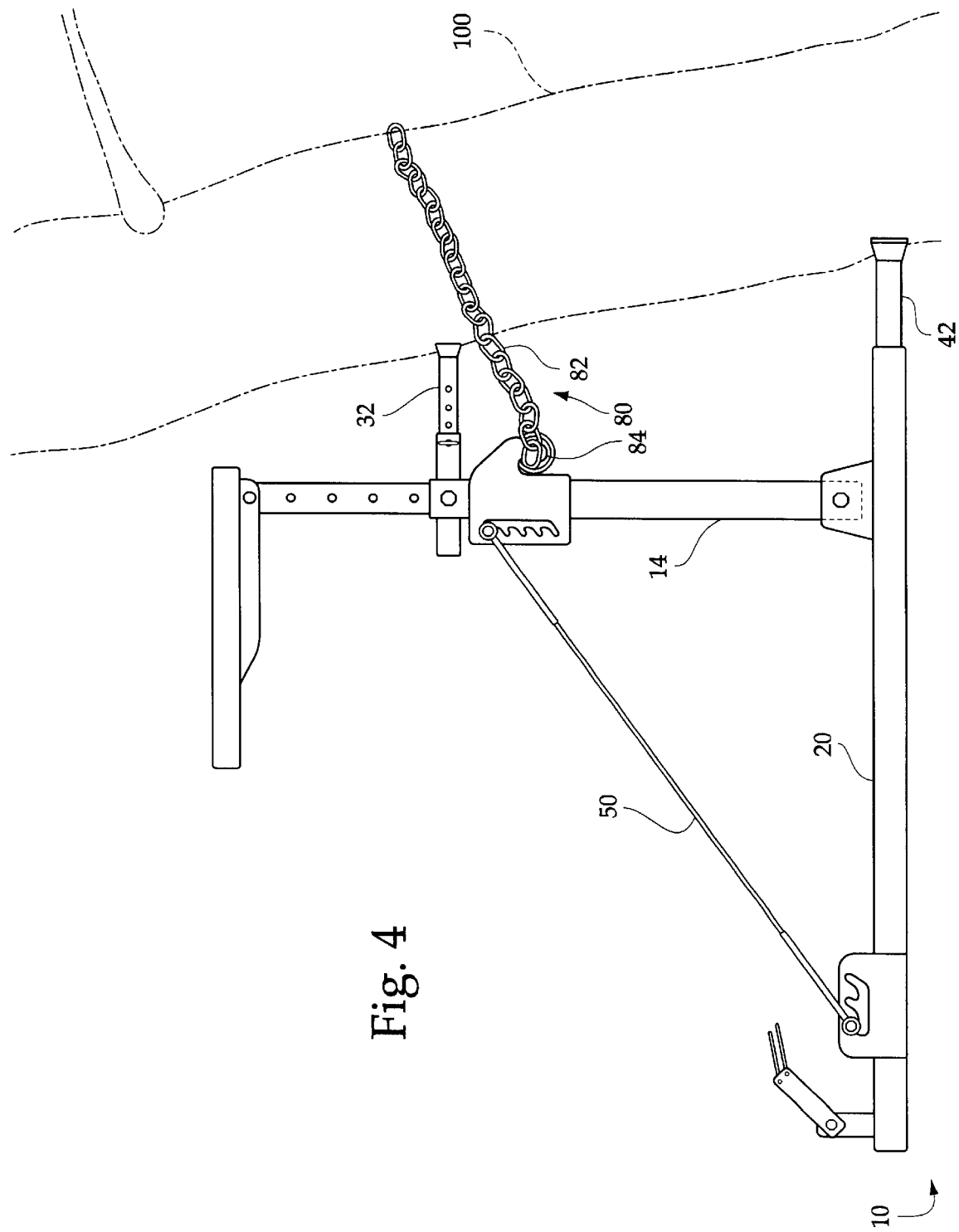
FIG. 4 is a side elevational view, illustrating the tree stand in use, mounted to a forward leaning tree.

Referring to FIG. 1 and FIG. 4, a strapping mechanism 80 is secured between each of the seat support bracing plates 54. The strapping mechanism 80 facilitates attachment to a tree 100. The strapping mechanism 80 may be a chain 82 having links 83, as illustrated, or may be a ratcheting strap, a chain and ratcheting strap combination, or any other device which is capable of securing to one of the seat supports 14, extending around the tree 100, and securing to the other of the seat supports 14. In the embodiment shown, where the chain 82 is employed, the seat support bracing plates 54 each have a downturned protuberance 84 which allows the chain 82 to be attached by extending through one of the links 83 of the chain. Upward tension on the chain 82, exerted by the tree 100 in response to the weight of and on the tree stand 10 keeps the chain 82 tightly against the downturned protuberance 84, and allows the chain 82 to support the weight of the tree stand 10 and the weight of the user.

Figure 5:
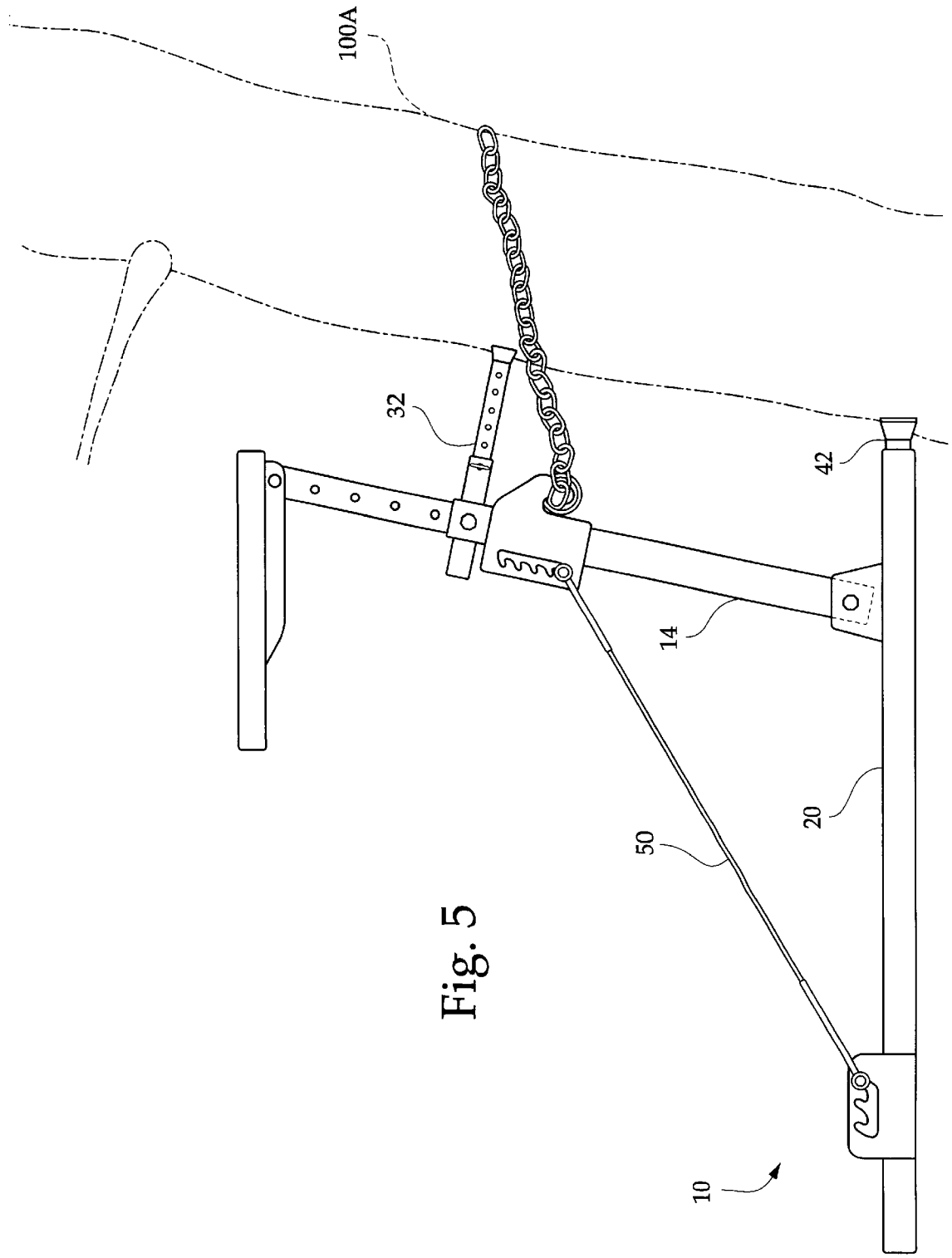
FIG. 5 is a side elevational view, illustrating the tree stand in use, mounted to a tree having a reverse lean, wherein the tree stand has been adapted to accommodate the tree.

Referring now to FIG. 4 and FIG. 5, various examples of the tree stand 10 in use are provided. In particular, FIG. 4 shows the tree stand 10 attached on a tree 100, wherein the tree 100 is leaning toward the stand 10. In this embodiment, the lower stanchions 42 are extended to meet the tree 100, and the upper stanchions 32 are in a somewhat retracted position. In addition, the bracing cables 50 are adjusted so that the platform 20 is substantially perpendicular to the seat supports 14. As a result of these adjustments, the platform 20 extends at a safe and comfortable horizontal angle.

However, in FIG. 5, the tree stand 10 is attached on a rear leaning tree 100A. If the tree stand 10 were configured in the same manner as in FIG. 4 on this rear leaning tree 100A, the platform 20 would be pitched severely toward the rear 10R. Accordingly, the lower stanchions 42 are fully retracted, and the upper stanchions 32 are nearly fully extended to meet the contours of the rear leaning tree 100A. Further, the bracing cables 50 are adjusted to allow the platform 20 and seat supports 14 to form an obtuse angle, which thereby once again allows the platform 20 to extend at a horizontal angle.

Figure 6:
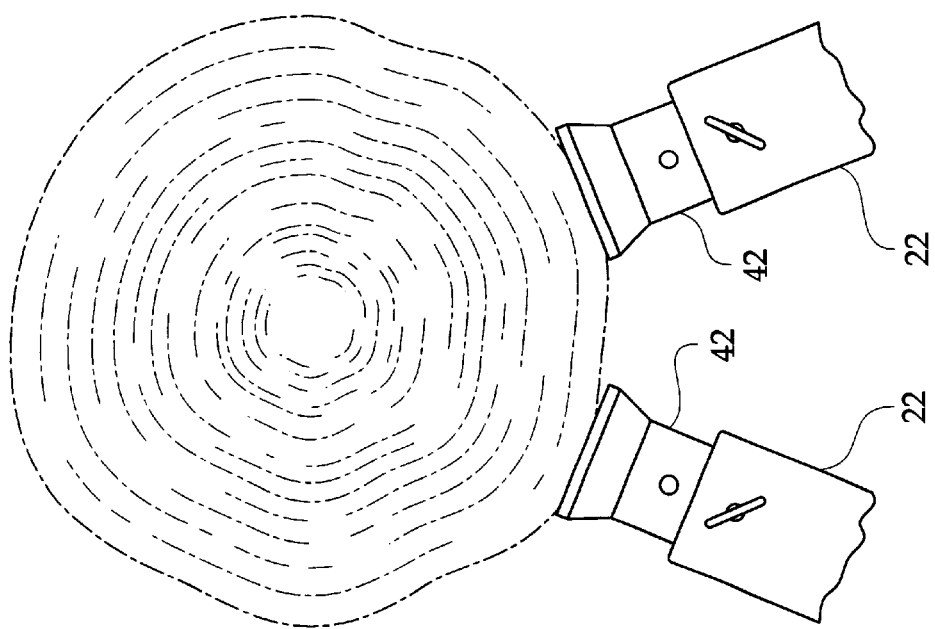
FIG. 6 is a top plan view, illustrating two of the levelers independently adjusted to meet the contours of the tree.

Referring to FIG. 6, in order to better conform to the contours of the tree 100, the tree stand 10 both angles the side members 22 toward each other and provides two separately adjustable lower stanchions 42—one extending from each of said side members 22. Because the upper stanchions and lower stanchions are independently adjustable, the greatest degree of adjustability is provided, to accommodate trees of different sizes.

Figure 7:
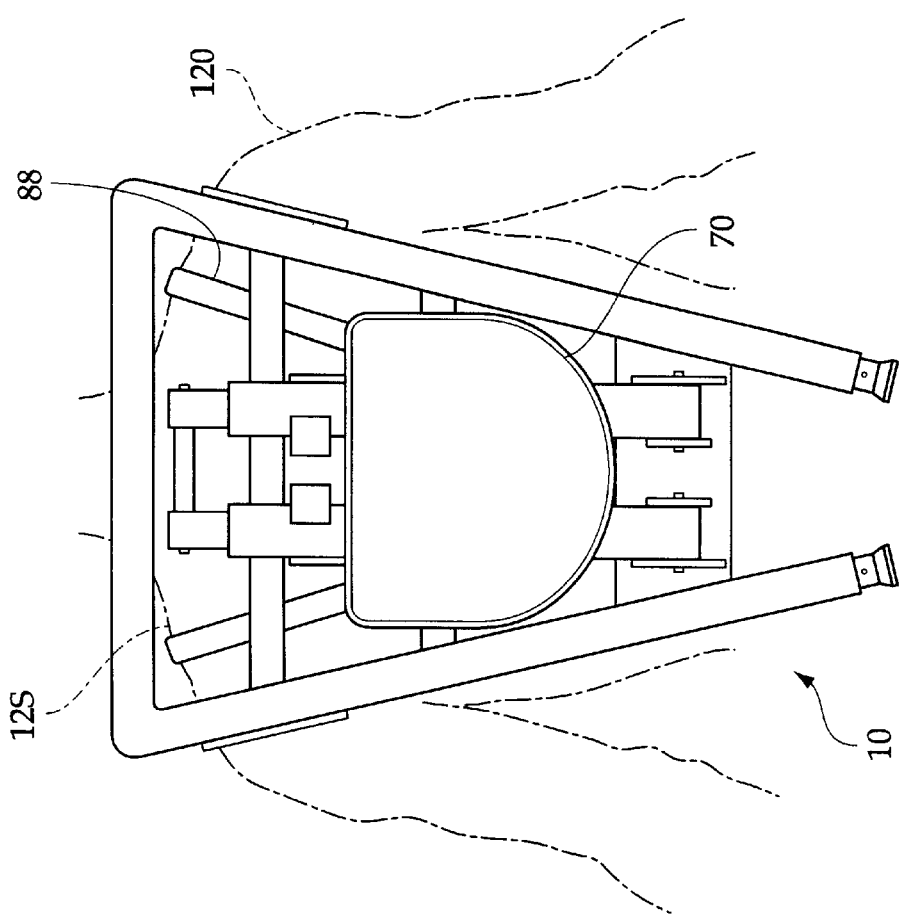
FIG. 7 is a side elevational view, illustrating the tree stand fully folded, and being worn by the user.

Referring to FIG. 3 and FIG. 7, the tree stand 10 is easily folded for compact storage and transport. In particular, since the bracing cables simply prevent the angle between the platform 20 and seat support from over-extending, they do not prevent the seat support from folding inward toward the platform 20 to an angle of nearly zero degrees. Accordingly, although in FIG. 3 the bracing cables 50 have been removed for clarity, they need not be removed before folding the tree stand 10 as shown. In addition, in FIG. 3, the seat has been removed, to allow the seat supports 14 to fold flat, and to keep the seat from extending beyond the front member 24. However, the seat 70 is easily attached between the downturned protuberances, as shown in FIG. 7. Then, through the use of straps 88, the tree stand 10 is easily donned by a user 120, and worn upon his back 125.

In conclusion, herein is presented a tree stand which may be compactly stored and transported, and which will quickly and easily deploy and adjust to trees of different configurations and having different lean angles to create an elevated platform thereon. The invention is illustrated by example in the various drawing figures contained herein. Numerous variations are possible, while adhering to the inventive concept. Such variations are contemplated as being a part of the present invention.

What is claimed is:

1. A tree stand, for use on a tree, comprising:
    a platform, comprising a front member, a rear member, and a pair of side members, the front member extending between the side members, the rear member extending between the side members, the side members angled toward each other such that the front member is longer than the rear member, the side members having an open end near the rear member;
    a pair of seat supports, each having a seat support top, the seat supports pivotally attached to the rear member opposite from the seat support top such that the seat supports are capable of varying an angle formed with the platform;
    a seat assembly, including a seat, mounted to the seat support tops such that seat is adjustable in height with respect to the platform; and
    a pair of lower levelers, including a pair of lower stanchions, each of the lower stanchions extending into a respective one of the open ends of one of the side members such that each of said lower stanchions is independently adjustable with respect to said side member to meet varying contours of the tree;
    a pair of upper levelers, each upper leveler including a sleeve and an upper stanchion mounted for slidable movement within the sleeve, each sleeve mounted to a respective one of the seat supports, the upper levelers each adjustable to accommodate varying contours of the tree; and
    a strapping means, for supporting the tree stand upon the tree by extending from one of the seat supports, around the tree, and then to the other of the seat supports.

2. The tree stand as recited in claim 1, further comprising a stabilizing system, for maintaining the angle between the platform and seat supports, having:
    a pair of seat support bracing plates, each seat support bracing plate attached to one of the seat supports;
    a pair of platform bracing plates, each platform bracing plate attached to one of the side members; and
    a pair of bracing cables, each bracing cable extending between one of the seat support bracing plates and one of the platform bracing plates.

3. The tree stand as recited in claim 2, wherein the seat support bracing plates and platform bracing plates each have a gated opening, each gated opening having a plurality of slots, and wherein each bracing cable has a coupling on each end which is capable of securing within the slots, the couplings in the seat support bracing plates may be moved to adjust a vertical position within said seat support bracing plates, the couplers in the platform bracing plates may be moved horizontally to adjust a horizontal position within said platform bracing plates, so as to adjust the angle between the platform and seat supports.

4. The tree stand as recited in claim 3, wherein the seat supports are tubular having an open upper end, and wherein the seat assembly further comprises:
    a seat carrier having a pair of parallel seat mounting members and a cross bar extending between the seat mounting members, the seat mounting members are spaced to extend into the seat support and are capable of telescopic height adjustment within the seat support; and
    a seat, having a bottom, having a pair of parallel brackets extending longitudinally along the bottom, the brackets fastened to the seat mounting members.

5. The tree stand as recited in claim 4, wherein each of the upper stanchions and lower stanchions have a plurality of transverse bores, and wherein the sleeves and the side members each have a matching hole, such that the matching holes and transverse bores are selectively alignable to allow a pin to extend therethough to fix the positions of the sleeves and upper stanchions and the side members and lower stanchions.

6. The tree stand as recited in claim 5, wherein the seat mounts are of rectangular cross section, having inner sides which face each other and outer sides which face away from each other, wherein the sleeves are mounted to the inner sides, and wherein the seat support bracing plates are mounted to the outer sides.

7. The tree stand as recited in claim 6, wherein the seat support bracing plates each have a downturned protuberance, and wherein the strapping means is a chain having links, and wherein one of the links of the chain extend into each of the protuberances.

* * * * *